US011901704B2

(12) United States Patent
Blankmeister et al.

(10) Patent No.: US 11,901,704 B2
(45) Date of Patent: Feb. 13, 2024

(54) BATCH OF SPARK PLUGS

(71) Applicant: Robert Bosch GmbH, Stuttgart (DE)

(72) Inventors: Matthias Blankmeister, Heiligenhaus (DE); Matthias Budde, Asperg (DE); Stephan Kaske, Sternenfels Diefenbach (DE); Ugur Yilmaz, Markgroeningen (DE); Ulrich Stockmeier, Bad Wildbad (DE); Philipp Rottmann, Bischberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/916,495

(22) PCT Filed: Jul. 13, 2021

(86) PCT No.: PCT/EP2021/069510
§ 371 (c)(1),
(2) Date: Sep. 30, 2022

(87) PCT Pub. No.: WO2022/028825
PCT Pub. Date: Feb. 10, 2022

(65) Prior Publication Data

US 2023/0187909 A1 Jun. 15, 2023

(30) Foreign Application Priority Data

Aug. 5, 2020 (DE) ..................... 10 2020 209 834.4

(51) Int. Cl.
*H01T 13/32* (2006.01)
*H01T 13/08* (2006.01)

(52) U.S. Cl.
CPC ............ *H01T 13/32* (2013.01); *H01T 13/08* (2013.01)

(58) Field of Classification Search
CPC ................................ H01T 13/32; H01T 13/08
See application file for complete search history.

(56) References Cited

U.S. PATENT DOCUMENTS

2002/0157629 A1* 10/2002 Inagaki .................. H01T 13/08 123/169 PA
2018/0294624 A1* 10/2018 Niessner ................ H01T 21/02

FOREIGN PATENT DOCUMENTS

DE 202008015598 U1 2/2009
DE 102013209150 A1 11/2014
(Continued)

OTHER PUBLICATIONS

International Search Report for PCT/EP2021/069510, dated Oct. 13, 2021.

*Primary Examiner* — Mary Ellen Bowman
(74) *Attorney, Agent, or Firm* — NORTON ROSE FULBRIGHT US LLP; Gerard A. Messina

(57) ABSTRACT

A batch of spark plugs. Each spark plug has a longitudinal axis, a central electrode oriented in the direction of the longitudinal axis, a ground electrode oriented at an angle to the longitudinal axis, such that a spark gap is formed between a tip of the central electrode and a tip of the ground electrode, and an outer thread for screwing the spark plug in the longitudinal direction into an inner thread of a cylinder head of a combustion chamber of an internal combustion engine, and has an annular contact surface oriented perpendicularly to the longitudinal axis and intended for bringing the spark plug to rest against the cylinder head. After the spark plugs have been screwed into the inner thread of the cylinder head, the ground electrodes have the same orientation with regard to a rotation about the longitudinal axis of the spark plug relative to the combustion chamber.

7 Claims, 3 Drawing Sheets

(56) References Cited

FOREIGN PATENT DOCUMENTS

| | | | | | |
|---|---|---|---|---|---|
| DE | 102017107728 | A1 | | 10/2018 | |
| EP | 1039601 | A1 | | 9/2000 | |
| EP | 1850432 | A2 | * | 10/2007 | ............. H01T 13/32 |
| EP | 1850432 | A2 | | 10/2007 | |
| WO | 2013164130 | A1 | | 11/2013 | |
| WO | WO-2013164130 | A1 | * | 11/2013 | ............. H01T 13/08 |

* cited by examiner

BATCH OF SPARK PLUGS

FIELD

The present invention relates to a method for producing a batch of spark plugs, in particular prechamber spark plugs.

BACKGROUND INFORMATION

A single prechamber spark plug and a method for its production are described, for example, in German Patent Application No. DE 10 2017 107 728 A1.

SUMMARY

According to the present invention, combustion within a combustion chamber of an internal combustion engine can be optimized by a coordinated orientation of the ground electrode of the associated spark plug, and that in this way in the case of prechamber spark plugs an optimal gas exchange within the prechamber and/or between the prechamber and the combustion chamber can be achieved.

With an object of realizing a specific orientation of the ground electrode in a reproducible manner, the present invention relates to a batch of spark plugs, wherein each spark plug of the batch has a longitudinal axis, a central electrode oriented in the direction of the longitudinal axis, a ground electrode oriented at an angle to the longitudinal axis, such that a spark gap is formed between a tip of the central electrode and a tip of the ground electrode, and an outer thread for screwing the spark plug in the longitudinal direction into an inner thread of a cylinder head of a combustion chamber of an internal combustion engine, and has an annular contact surface which is oriented perpendicularly to the longitudinal axis and is intended for bringing the spark plug to rest against the cylinder head. In this case, it is provided that, in all spark plugs of the batch, after the spark plug has been screwed into the inner thread of the cylinder head as intended, the ground electrodes have the same orientation with regard to a rotation about the longitudinal axis of the spark plug relative to the combustion chamber.

Consequently, the coordinated orientation of the ground electrode and thus the advantages specified above are achieved with each spark plug of this batch after the spark plug has been screwed in as intended.

An intended screwing-in is in particular a screwing-in with a torque that is fixedly predefined for all spark plugs, e.g., 30 Nm.

The orientation of a thread is understood in particular to mean the orientation of the start (that is to say the end pointing away from the combustion chamber) and/or the end (that is to say the end pointing toward the combustion chamber) of the thread with regard to a rotation about the longitudinal axis of the spark plug.

A batch of spark plugs is to be understood to mean a plurality of spark plugs, for example at least two or three. In particular, the batch may be a plurality of spark plugs produced, for example, in continuous series production, one after the other or in parallel.

A development of the present invention provides that each spark plug of the batch has a cap comprising at least one through-opening, such that a prechamber is formed which communicates with the combustion chamber via the through-opening. Here it is provided in particular that, with regard to its location and/or its direction, the through-opening is offset and/or tilted with respect to the longitudinal axis of the spark plug, i.e. is not on the longitudinal axis of the spark plug. Here it is provided in particular that, in all spark plugs of the batch, after the spark plug has been screwed into the inner thread of the cylinder head as intended, the through-openings have the same orientation with regard to a rotation about the longitudinal axis of the spark plug relative to the combustion chamber. In this case, the prechamber spark plugs of the batch can be oriented identically to one another in the combustion chamber with regard to their caps and their ground electrodes. The combustion can thus be optimized.

Every internal combustion engine has individual properties, for example regarding the position of the spark plug in relation to an injection jet. For this reason, a coordinated positioning and orientation of the ground electrode is very advantageous for an optimal gas exchange within the prechamber of the spark plug as well as between the prechamber and the combustion chamber.

Various methods for producing the batch of spark plugs according to the present invention are specified in the exemplary embodiments disclosed herein.

DETAILED DESCRIPTION OF EXAMPLE EMBODIMENTS

In the following, with reference to FIGS. 1 and 2, a prechamber spark plug 1 according to an exemplary embodiment of the present invention is described.

Figure 1:
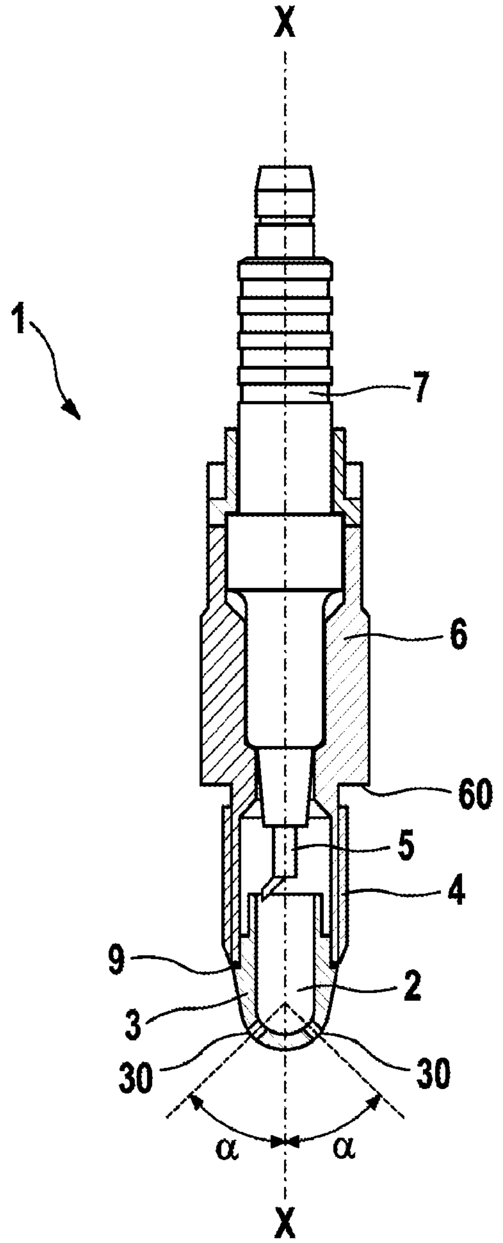
FIG. 1 is a schematic sectional view of a prechamber spark plug according to an exemplary embodiment of the present invention.
Figure 2:
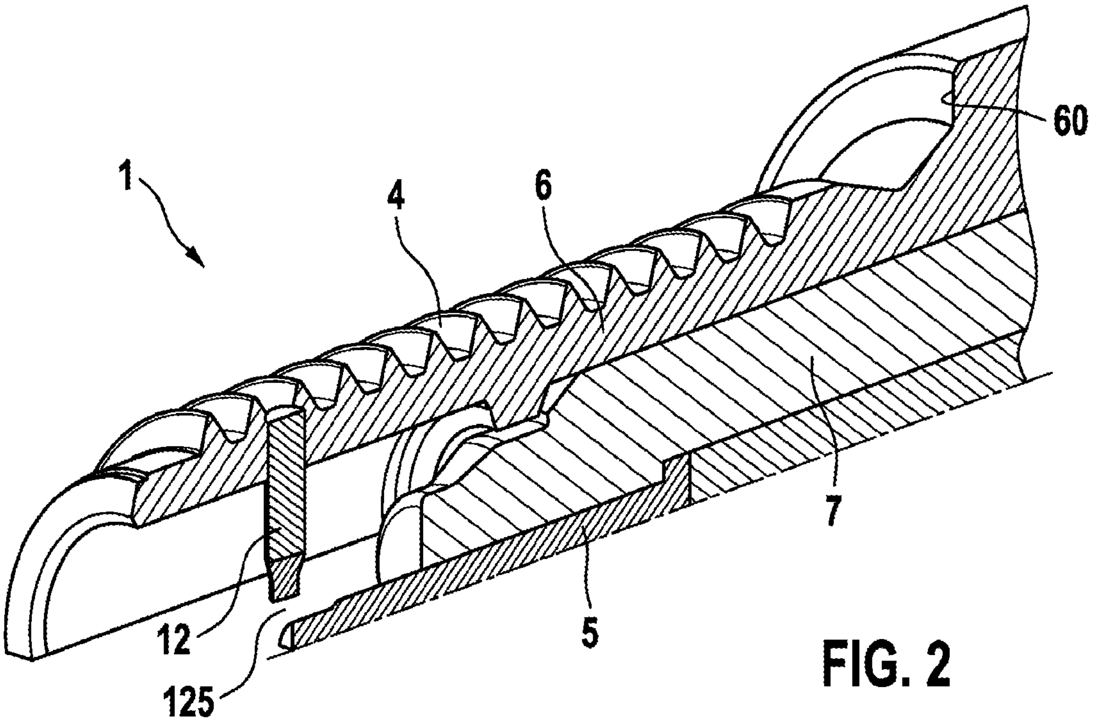
FIG. 2 is a schematic perspective partial view of the prechamber spark plug of FIG. 1 without a prechamber.

As can be seen from FIG. 1 and FIG. 2, the prechamber spark plug 1 comprises a prechamber 2, which is defined by a cap 3 that is U-shaped in section.

The cap 3 is fixed to a housing 6 of the prechamber spark plug 1, for example by means of a welded connection 9.

The prechamber spark plug 1 further comprises a central electrode 5 and an insulator 7.

On the housing 6, an outer thread 4 is provided on the outer circumference. The start of the outer thread 4 lies at the end of the outer thread 4 pointing away from the combustion chamber and defines an orientation of the outer thread 4 relative to the prechamber spark plug 1. The outer thread 4 is formed adjacently to the cap 3 and serves, for example, for fixing the prechamber spark plug 2 in a cylinder head of a combustion chamber of an internal combustion engine.

A plurality of through-holes 30 are provided in the cap 3, each of which is arranged at an angle $\alpha$ to a longitudinal axis X-X of the prechamber spark plug 1. When ignition occurs in the prechamber 2 of the prechamber spark plug 1, so-called flare jets are discharged through the through-holes 30 into the combustion chamber of an internal combustion engine, which then ignite a mixture in the combustion chamber.

At the level of the outer thread 4, the housing 6 has a bore into which a ground electrode 12 is pressed, for example, such that a spark gap 125 is formed between a tip of the central electrode 5 and a tip of the ground electrode 12.

The spark plug 1 further has an annular contact surface 60 oriented perpendicularly to the longitudinal axis X-X.

An intended screwing-in of the spark plug 1 into an inner thread of a cylinder head provides for example that the contact surface 60 comes to rest against a cylinder head of a spark plug 1. According to a predefined torque acting on the spark plug about the longitudinal axis X-X (e.g. 30 Nm), the intended screwing-in comes to its conclusion. The spark plug 1 is then fully installed on the cylinder head and the orientation of the ground electrode 12 is defined by its orientation relative to the outer thread 4 of the spark plug.

Figure 3:
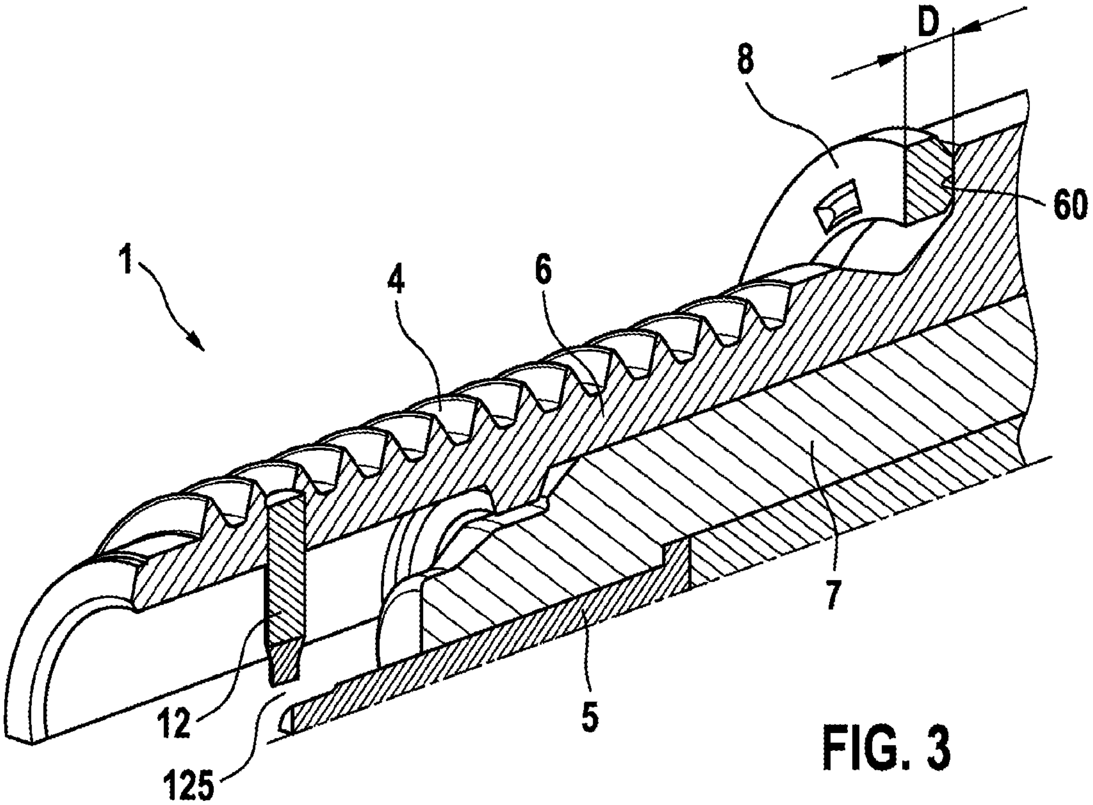
FIG. 3 is a schematic perspective partial view of an alternative prechamber spark plug.

An alternative embodiment is shown in FIG. 3. It differs in that, between the contact surface 60 of the spark plug 1 and the cylinder head, a gasket 8 is provided, the thickness of which is D. In this case, an intended screwing-in of the spark plug 1 into an inner thread of a cylinder head provides for example that the contact surface 60 comes to rest against the gasket 8 and this in turn comes to rest against a cylinder head of a spark plug 1. According to a predefined torque acting on the spark plug 1 about the longitudinal axis X-X (e.g. 30 Nm), the intended screwing-in comes to its conclusion. The spark plug 1 is then fully installed with the gasket 8 on the cylinder head and the orientation of the ground electrode 12 is defined by its orientation relative to the outer thread 4 of the spark plug 1 and by the thickness D of the gasket 8. If the thickness D of the gasket 8 is always selected to be the same, the orientation of the ground electrode 12 can be understood as being defined by its orientation relative to the outer thread 4 of the spark plug 1. On the other hand, the thickness D of the gasket 8 can also be specifically varied in order to set the orientation of the ground electrode 12 in the intended screwed-in state.

Figure 4:
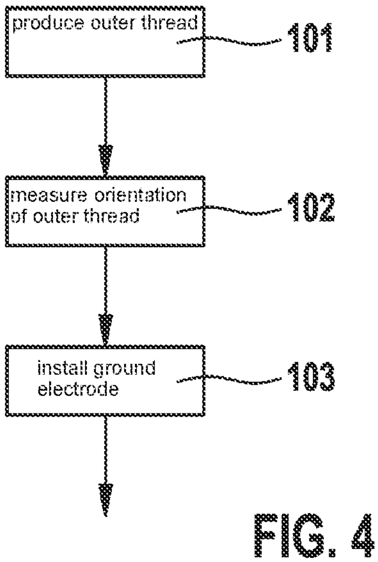
FIGS. 4-6 are flow diagrams of different exemplary embodiments of the method according to the present invention.

A first exemplary embodiment of the method according to the present invention is illustrated with reference to FIG. 4. Accordingly, spark plugs 1 of a batch are produced by, for each spark plug 1, the outer thread 4 first being produced with an individually arbitrary orientation with regard to a rotation about the longitudinal axis X-X of the spark plug 1 (Step 101), then the orientation of the outer thread 4 being measured in a measurement step (Step 102), and then the ground electrode 12 being installed in an installation step (Step 103) with a defined orientation relative to the outer thread 4. For this purpose, for example, a bore is made in the housing 6 of the spark plug 1 and the ground electrode 12 is pressed and/or welded into the bore.

Figure 5:
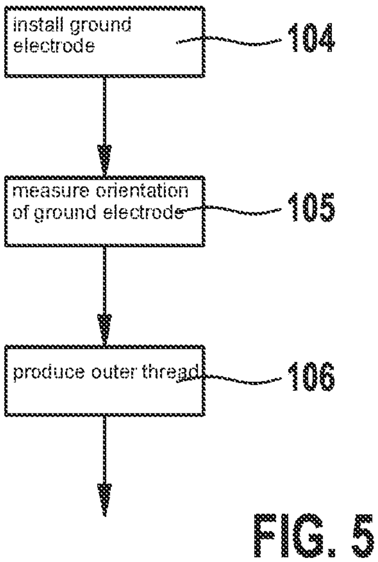

A second exemplary embodiment of the method according to the present invention is illustrated with reference to FIG. 5. Accordingly, spark plugs 1 of a batch are produced by, for each spark plug 1, the ground electrode 12 being installed with an orientation that is individually arbitrary with regard to a rotation about the longitudinal axis X-X of the spark plug 1 (Step 104), then the orientation of the ground electrode 12 being measured in a measurement step (Step 105), and then the outer thread 4 being produced with a defined orientation relative to the ground electrode 12 (Step 106).

Figure 6:
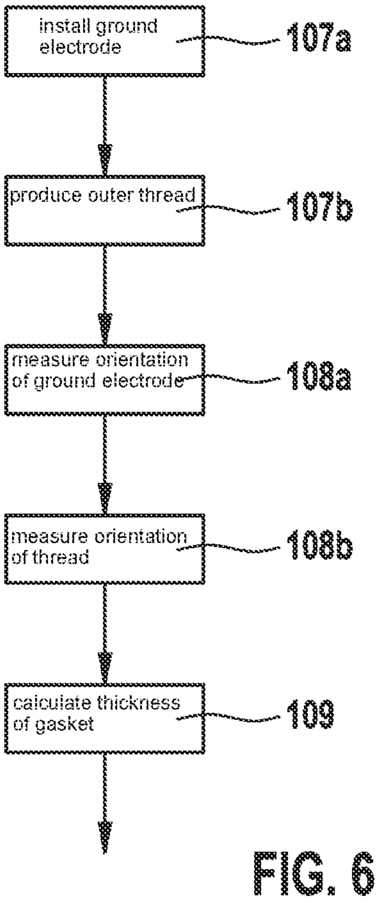

A third exemplary embodiment of the method according to the present invention is illustrated with reference to FIG. 6. Accordingly, spark plugs 1 of a batch are produced by, for each spark plug 1, the ground electrode 12 being installed with an orientation that is individually arbitrary with regard to a rotation about the longitudinal axis X-X of the spark plug (Step 107*a*) and the outer thread 4 being produced with an individually arbitrary orientation with regard to a rotation about the longitudinal axis X-X of the spark plug 1 (Step 107*b*), the orientation of the ground electrode 12 being measured in a first measurement step (Step 108*a*), the orientation of the outer thread 4 being measured in a second measurement step (Step 108*b*), a target thickness Ds of a gasket 8 being calculated from the orientation of the ground electrode 12 and the orientation of the outer thread 4 in a calculation step (Step 109), and finally the spark plug 1 being assigned a gasket 8, the thickness D of which corresponds to the target thickness Ds, for being installed between the contact surface 60 and the cylinder head (Step 110).

In the calculation step 109, the target thickness Ds of the gasket 8 can be calculated from a standard thickness DO of the gasket 8 plus a constant c multiplied by the pitch d of the outer thread 4 and by an angle which represents an orientation of the ground electrode 12 relative to the outer thread 4.

What is claimed is:

1. A batch of spark plugs:

wherein each spark plug of the batch has a longitudinal axis, a central electrode oriented in a direction of the longitudinal axis, a ground electrode oriented at an angle to the longitudinal axis such that a spark gap is formed between a tip of the central electrode and a tip of the ground electrode, and an outer thread for screwing the spark plug in the longitudinal direction into an inner thread of a cylinder head of a combustion chamber of an internal combustion engine, and has an annular contact surface which is oriented perpendicularly to the longitudinal axis and is intended for bringing the spark plug to rest against the cylinder head;

wherein for all spark plugs of the batch, after the spark plugs has been screwed into the inner threads of the cylinder head as intended, the ground electrodes have the same orientation with regard to a rotation about the longitudinal axis of the spark plug relative to the combustion chamber, wherein the ground electrode is situated within a level of the outer thread.

2. The batch of spark plugs according to claim 1, wherein each spark plug of the batch has a cap including at least one through-opening, such that a prechamber is formed which communicates with the combustion chamber via the through-opening.

3. The batch of spark plugs according to claim 1, wherein, with regard to location of the through-opening and/or direction of the through-opening, the through-opening is offset and/or tilted with respect to the longitudinal axis of the spark plug, and wherein all spark plugs of the batch, after the spark plugs have been screwed into the inner threads of the cylinder head as intended, the through-openings have the same orientation with regard to a rotation about the longitudinal axis of the spark plug relative to the combustion chamber.

4. A method for producing a batch of spark plugs, wherein each spark plug of the batch has a longitudinal axis, a central electrode oriented in a direction of the longitudinal axis, a ground electrode oriented at an angle to the longitudinal axis such that a spark gap is formed between a tip of the central electrode and a tip of the ground electrode, and an outer thread for screwing the spark plug in the longitudinal direction into an inner thread of a cylinder head of a combustion chamber of an internal combustion engine, and has an annular contact surface which is oriented perpendicularly to the longitudinal axis and is intended for bringing the spark plug to rest against the cylinder head, wherein for all spark plugs of the batch, after the spark plugs has been screwed into the inner threads of the cylinder head as intended, the ground electrodes have the same orientation with regard to a rotation about the longitudinal axis of the spark plug relative to the combustion chamber, the method comprising:

providing, for each of the spark plugs, the outer thread and/or the ground electrode with an individually arbitrary orientation with regard to a rotation about the longitudinal axis of the spark plug, wherein the ground electrode is situated within a level of the outer thread.

5. The method according to claim 4, wherein, for each spark plug of the batch, the outer thread is first produced with an individually arbitrary orientation with regard to a rotation about the longitudinal axis of the spark plug, the orientation of the outer thread is then measured in a measurement step, and the ground electrode is then installed in an installation step with a defined orientation relative to the outer thread.

6. The method according to claim 4, wherein, for each spark plug of the batch, the ground electrode is first installed with an orientation that is individually arbitrary with regard to a rotation about the longitudinal axis of the spark plug, the orientation of the ground electrode is then measured in a measurement step, and the outer thread is then produced with a defined orientation relative to the ground electrode.

7. The method according to claim 4, wherein, for each spark plug of the batch, the ground electrode is installed with an orientation that is individually arbitrary with regard to a rotation about the longitudinal axis of the spark plug and the outer thread is produced with an individually arbitrary orientation with regard to a rotation about the longitudinal axis of the spark plug, the orientation of the ground electrode is measured relative to the orientation of the outer thread in a measurement step, a target thickness of a gasket is calculated from a relative orientation of the ground electrode in a calculation step, and the spark plug is assigned a gasket, a thickness of which corresponds to the target thickness, for being installed between the contact surface and the cylinder head.

* * * * *